(12) United States Patent
Hirosawa et al.

(10) Patent No.: US 11,289,872 B2
(45) Date of Patent: Mar. 29, 2022

(54) PLANAR WAVEGUIDE AND LASER AMPLIFIER

(71) Applicant: Mitsubishi Electric Corporation, Tokyo (JP)

(72) Inventors: Kenichi Hirosawa, Tokyo (JP); Fumio Shohda, Tokyo (JP); Shumpei Kameyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 114 days.

(21) Appl. No.: 16/769,473

(22) PCT Filed: Dec. 28, 2017

(86) PCT No.: PCT/JP2017/047248
§ 371 (c)(1),
(2) Date: Jun. 3, 2020

(87) PCT Pub. No.: WO2019/130551
PCT Pub. Date: Jul. 4, 2019

(65) Prior Publication Data
US 2020/0388978 A1 Dec. 10, 2020

(51) Int. Cl.
H01S 3/06 (2006.01)
H01S 3/094 (2006.01)

(52) U.S. Cl.
CPC .......... H01S 3/0621 (2013.01); H01S 3/0604 (2013.01); H01S 3/09403 (2013.01); H01S 3/094038 (2013.01)

(58) Field of Classification Search
CPC ....... H01S 3/0619–0623; H01S 3/0604; H01S 3/063–0637; H01S 3/08095;
(Continued)

(56) References Cited

U.S. PATENT DOCUMENTS 5,197,072 A * 3/1993 Harada et al.
5,291,501 A * 3/1994 Hanna
(Continued)

FOREIGN PATENT DOCUMENTS

AU 2009200094 A1 * 2/2009
CA 2311008 A1 * 12/2000
(Continued)

OTHER PUBLICATIONS

Extended European Search Report issued in the corresponding European Patent Application No. 17 936 186.0 dated Feb. 3, 2021.
(Continued)

Primary Examiner — Joshua King
(74) Attorney, Agent, or Firm — Birch, Stewart, Kolasch & Birch, LLP

(57) ABSTRACT

Included are: a first dielectric multilayer film (15) for transmitting a wavelength band including a wavelength of signal light (2) and reflecting first excitation light (4), the first dielectric multilayer film (15) being disposed on one of two end surfaces of a core (11), a first inner cladding (12), a first outer cladding (13), and a second outer cladding (14); and a second dielectric multilayer film (12) for transmitting a wavelength band including the wavelength of the signal light (2) and reflecting the first excitation light (4), the second dielectric multilayer film (12) being disposed on the other one of the two end surfaces.

12 Claims, 6 Drawing Sheets

(58) Field of Classification Search
CPC . H01S 3/094038; H01S 3/0941–09415; H01S 3/09403; H01S 3/09408; H01S 3/094007; H01S 3/094096
See application file for complete search history.

(56) References Cited

U.S. PATENT DOCUMENTS

| | | | | |
|---|---|---|---|---|
| 5,502,737 | A * | 3/1996 | Chartier | H01S 3/113 372/11 |
| 6,160,824 | A * | 12/2000 | Meissner | H01S 3/0632 372/10 |
| 7,217,585 | B1 * | 5/2007 | Sumida | G02B 6/1342 438/31 |
| 2002/0181534 | A1 * | 12/2002 | Hodgson | H01S 3/063 372/66 |
| 2003/0137722 | A1 * | 7/2003 | Nikolajsen | H01S 3/0635 359/341.1 |
| 2003/0138021 | A1 * | 7/2003 | Hodgson | H01S 3/0632 372/75 |
| 2007/0297737 | A1 * | 12/2007 | Hashimoto | G02B 6/126 385/129 |
| 2008/0175292 | A1 * | 7/2008 | Sheik-Bahae | H01S 3/0612 372/45.01 |
| 2011/0134953 | A1 * | 6/2011 | Weichmann | H01S 3/06716 372/49.01 |
| 2012/0327962 | A1 * | 12/2012 | Stultz | H01S 3/1698 372/29.02 |
| 2015/0229096 | A1 * | 8/2015 | Akino | H01S 3/042 372/36 |
| 2015/0236470 | A1 * | 8/2015 | Newburgh | H01S 3/0632 372/6 |
| 2016/0301179 | A1 * | 10/2016 | Watanabe | H01S 3/1608 |

FOREIGN PATENT DOCUMENTS

| | | | |
|---|---|---|---|
| CA | 2311982 | A1 * | 12/2000 |
| CN | 105874661 | A * | 8/2016 |
| CN | 105896240 | A * | 8/2016 |
| CN | 111769427 | A * | 10/2020 |
| CN | 113131320 | A * | 7/2021 |
| FR | 2784809 | A1 * | 4/2000 |
| JP | 6192883 | B1 * | 9/2017 |
| JP | 6811898 | B1 * | 1/2021 |
| WO | WO-2005088782 | A1 * | 9/2005 |
| WO | WO-2008117249 | A1 * | 10/2008 |
| WO | WO-2011027579 | A1 * | 3/2011 |

OTHER PUBLICATIONS

Katsunari Okamoto, "Theory of Optical Waveguides", Corona Publishing Co., Ltd, 1992, pp. 14-27.
Lancaster et al., "In-fiber resonantly pumped Q-switched holmium fiber laser", Optics Letters, Nov. 1, 2009, vol. 34, No. 21, pp. 3412-3414.
Minoru Yoshida, "Technologies of High-Beam Quality Fiber Lasers and Their Applications", Kogaku, Optical Society of Japan, 2011, vol. 40, No. 3, pp. 122-128.
Chinese Office Action dated Jan. 4, 2022 issued in corresponding Chinese Patent Application No. 201780097892.3 with an English Translation.

* cited by examiner

PLANAR WAVEGUIDE AND LASER AMPLIFIER

TECHNICAL FIELD

The present invention relates to a planar waveguide including a plate-like core for amplifying signal light by absorbing first excitation light and forming a population inversion and to a laser amplifier having the planar waveguide.

BACKGROUND ART

For example, Patent Literature 1 below discloses an optical fiber having a double-cladding structure in which doped glass is used as the inner cladding.

The optical fiber having the double-cladding structure in which the doped glass is used as the inner cladding includes a core made of glass that has the property of emitting oscillation light by absorbing first excitation light and forming a population inversion.

The optical fiber having the double-cladding structure in which the doped glass is used as an inner cladding includes the inner cladding disposed around the core so as to surround the core and an outer cladding disposed around the inner cladding so as to surround the inner cladding.

The inner cladding is made of glass having a refractive index lower than that of the core, and emits the first excitation light by absorbing second excitation light and forming a population inversion. The first excitation light is the oscillation light of the inner cladding.

Since the inner cladding emits the first excitation light, there is no need to prepare a separate light source for introducing the first excitation light into the optical fiber.

The outer cladding is made of glass having a refractive index lower than that of the inner cladding, and totally reflects the first excitation light.

Since the oscillation light emitted from the core is totally reflected by the inner cladding it is confined in the core.

CITATION LIST

Patent Literatures

Patent Literature 1: U.S. Pat. No. 5,291,501 A

SUMMARY OF INVENTION

Technical Problem

Optical fibers of the related art having a double-cladding structure in which doped glass is used as the inner cladding emit light when the core oscillates, and does not amplify signal light emitted from an external signal light source.

For this reason, when the optical fibers are used as an amplifier for amplifying signal light emitted from an external signal light source, parasitic oscillation of the core occurs. Occurrence of parasitic oscillation of the core amplifies not only the signal light emitted from the signal light source but also light having a wavelength different from the wavelength of the signal light, and thus there is a disadvantage that the amplification factor of the signal light drops.

The present invention has been made in order to solve the above-described disadvantage, and an object of the present invention is to obtain a planar waveguide and a laser amplifier that can prevent parasitic oscillation of the core.

Solution to Problem

A planar waveguide according to the present invention includes: a plate-like core for amplifying signal light by absorbing first excitation light and forming a population inversion; a plate-like first inner cladding for emitting the first excitation light by absorbing second excitation light and forming a population inversion and reflecting the signal light, the first inner cladding being attached to one of two planes of the core; a plate-like first outer cladding for reflecting the first excitation light, the first outer cladding being attached to one of two planes of the first inner cladding which is a plane opposite to a plane to which the core is attached; a plate-like second outer cladding for reflecting each of the first excitation light and the signal light, the second outer cladding being attached to another of the two planes of the core which is a plane opposite to the plane to which the first inner cladding is attached; a first dielectric multilayer film for transmitting light in a wavelength band including a wavelength of the signal light and reflecting the first excitation light, the first dielectric multilayer film being disposed on one of two end surfaces of the core, the first inner cladding, and the first and second outer claddings, and; a second dielectric multilayer film for transmitting light in a wavelength band including the wavelength of the signal light and reflecting the first excitation light, the second dielectric multilayer film being disposed on the other one of the two end surfaces.

Advantageous Effects of Invention

According to the present invention, included are: a core; a first inner cladding; a first dielectric multilayer film for transmitting light having a wavelength band including the wavelength of signal light and reflecting first excitation light, the first dielectric multilayer film being disposed on one of two end surfaces of first and second outer claddings; and a second dielectric multilayer film for transmitting light having a wavelength band including the wavelength of the signal light and reflecting the first excitation light, the second dielectric multilayer film being disposed on the other one of the two end surfaces. Therefore, there is an effect of preventing the parasitic oscillation of the core.

DESCRIPTION OF EMBODIMENTS

To describe the present invention further in detail, embodiments for carrying out the present invention will be described below with reference to the accompanying drawings.

First Embodiment

Figure 1:
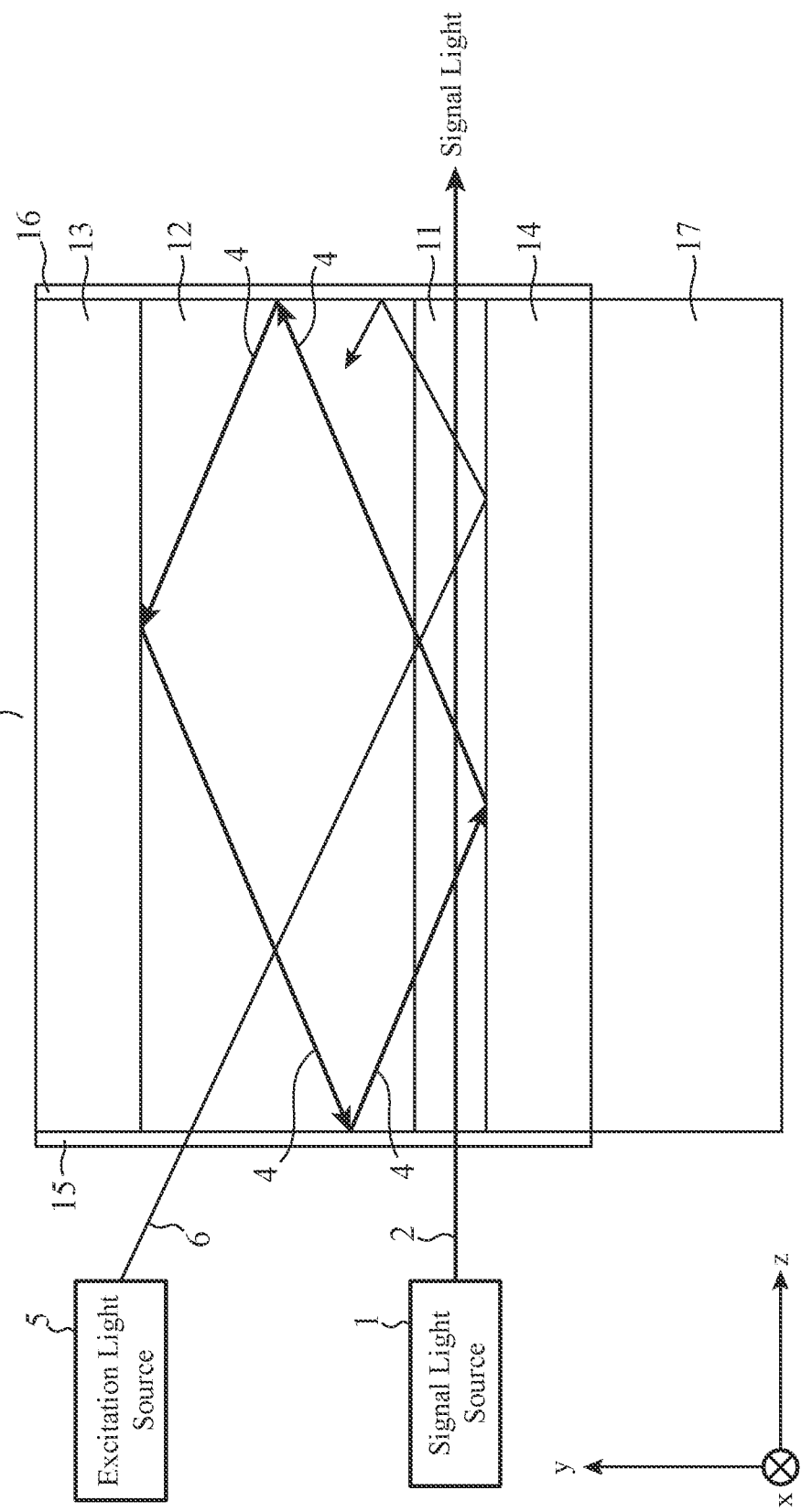
FIG. 1 is a configuration diagram illustrating a laser amplifier including a planar waveguide according to a first embodiment.

FIG. 1 is a configuration diagram illustrating a laser amplifier including a planar waveguide according to a first embodiment.

In FIG. 1, a signal light source 1 emits signal light 2 to a planar waveguide 3.

The planar waveguide 3 is a transmission path that includes a core 11, a first inner cladding 12, a first outer cladding 13, a second outer cladding 14, a first dielectric multilayer film 15, a second dielectric multilayer film 16, and a heat sink 17 and amplifies the signal light 2 emitted from the signal light source 1 and emits the amplified signal light 2.

In FIG. 1, the direction parallel to the optical axis is referred to as the z axis, and the direction perpendicular to a plane in the planar waveguide 3 is referred to as the y axis.

The direction perpendicular to each of the y axis and the z axis is referred to as the x axis.

An excitation light source 5 emits second excitation light 6 to the planar waveguide 3, and is generally implemented by a coherent light source such as a laser diode. Since the arrangement of a light source is relatively flexible in the planar waveguide 3, it is possible to use an incoherent light source such as a flash lamp or a light emitting diode (LED) as the excitation light source 5.

In FIG. 1 an example is illustrated in which the excitation light source 5 is disposed in the −z direction and the +x direction (or −x direction) with respect to the planar waveguide 3.

In the example of FIG. 1, it is illustrated that the second excitation light 6 emitted from the excitation light source 5 passes through the first dielectric multilayer film 15. However, since the position of the excitation light source 5 is shifted in the +x direction or the −x direction of the planar waveguide 3, the second excitation light 6 emitted from the excitation light source 5 is actually incident on the planar waveguide 3 from the front side or the back side of the paper, and does not pass through the first dielectric multilayer film 15.

The position where the excitation light source 5 is disposed is not limited to the position illustrated in FIG. 1 as long as the second excitation light 6 emitted from the excitation light source 5 is incident on the planar waveguide 3.

For example, in a case where a multilayer film that transmits the second excitation light 6 is used as the first dielectric multilayer film 15 described later, the excitation light source 5 is not required to be shifted in the +x direction nor the −x direction with respect to the planar waveguide 3 even when the excitation light source 5 is disposed in the −z direction with respect to the planar waveguide 3.

The core 11 is a plate-like gain generating member that absorbs first excitation light 4 emitted from the first inner cladding 12 to form a population inversion and generates a gain by radiation transition.

The core 11 absorbs the first excitation light 4 to form a population inversion, thereby amplifying the signal light 2 emitted from the signal light source 1 and emitting the amplified signal light 2 to the outside environment.

As the core 11, glass doped with rare earth elements such as erbium (Er), ytterbium (Yb), thulium (Tm), neodymium (Nd), and holmium (Ho) is used.

Alternatively, as the core 11, a crystal doped with a rare earth such as neodymium-doped yttrium orthovanadate (Nd:YVO4), ceramic made from a crystal material doped with a rare earth element such as ytterbium doped yttrium aluminum garnet (Yb:YAG), or a crystal doped with a transition metal such as chromium-doped yttrium aluminum garnet (Cr:YAG) and titanium sapphire (Ti:Sapphire) is used.

The first inner cladding 12 is attached to one of the two planes of the core 11.

In the example of FIG. 1, the two planes of the core 11 are the top surface and the bottom surface of the core 11, and the first inner cladding 12 is attached to the top surface of the core 11.

The first inner cladding 12 is a plate-like gain generating member that absorbs the second excitation light 6 emitted from the excitation light source 5 to form a population inversion and generates a gain by radiation transition.

The first inner cladding 12 emits the first excitation light 4 and reflects the signal light 2 by absorbing the second excitation light 6 and forming the population inversion.

As the first inner cladding 12, a material that can oscillate the excitation wavelength of the core 11 is used from among glass doped with rare earth elements such as Er, Yb, Tm, Nd, or Ho, a crystal doped with a rare earth such as Nd:YVO4, ceramic made from a crystal material doped with a rare earth element such as Yb:YAG, or a crystal doped with a transition metal such as Cr:YAG and Ti:Sapphire.

The first outer cladding 13 is attached to a plane on the opposite side of the plane to which the core 11 is attached, of the two planes of the first inner cladding 12.

In the example of FIG. 1, the two planes of the first inner cladding 12 are the top surface and the bottom surface of the first inner cladding 12, and the first outer cladding 13 is attached to the top surface of the first inner cladding 12.

The first outer cladding 13 is, for example, a plate-like optical glass, and reflects the first excitation light 4 emitted from the first inner cladding 12.

The second outer cladding 14 is attached to the plane on the opposite side to the plane to which the first inner cladding 12 is attached, of the two planes of the core 11.

In the example of FIG. 1, the second outer cladding 14 is attached to the bottom surface of the core 11.

The second outer cladding 14 is, for example, a plate-like optical glass, and reflects each of the first excitation light 4 and the signal light 2 emitted from the first inner cladding 12.

The first outer cladding 13 and the second outer cladding 14 may be made of the same material or different materials.

The first dielectric multilayer film 15 is disposed on one of the two end surfaces of the planar waveguide 3 including the core 11, the first inner cladding 12, the first outer cladding 13, and the second outer cladding 14.

In the example of FIG. 1, the two end surfaces of the planar waveguide 3 are the left end surface and the right end surface of the planar waveguide 3 in the figure, and the first dielectric multilayer film 15 is disposed on the left end surface.

The first dielectric multilayer film 15 transmits light of a wavelength band including the wavelength of the signal light 2 emitted from the signal light source 1 and reflects the first excitation light 4 emitted from the first inner cladding 12.

As the first dielectric multilayer film 15, a multilayer film is used which has a high transmittance in a wavelength band including the wavelength of the signal light 2 and a high reflectance in a wavelength band including the wavelength of the first excitation light 4.

It is assumed in the first embodiment that the first dielectric multilayer film 15 is attached to the left end surface of the planar waveguide 3; however, a glass substrate to which the first dielectric multilayer film 15 is attached may be disposed in the vicinity of the left end surface of the planar waveguide 3.

The second dielectric multilayer film 16 is disposed on the other one of the two end surfaces of the planar waveguide 3.

In the example of FIG. 1, the second dielectric multilayer film 16 is disposed on the right end surface.

The second dielectric multilayer film 16 transmits light of a wavelength band including the wavelength of the signal light 2 emitted from the core 11 and reflects the first excitation light 4 emitted from the first inner cladding 12.

As the second dielectric multilayer film 16, a multilayer film is used which has a high transmittance in a wavelength band including the wavelength of the signal light 2 and a high reflectance in a wavelength band including the wavelength of the first excitation light 4.

It is assumed in the first embodiment that the second dielectric multilayer film 16 is attached to the right end surface of the planar waveguide 3; however, a glass substrate to which the second dielectric multilayer film 16 is attached may be disposed in the vicinity of the right end surface of the planar waveguide 3.

The heat sink 17 is disposed on the plane opposite to the plane on which the core 11 is attached, out of the two planes of the second outer cladding 14.

In the example of FIG. 1, the two planes of the second outer cladding 14 are the top surface and the bottom surface of the second outer cladding 14, and the heat sink 17 is disposed on the bottom surface of the second outer cladding 14.

The heat sink 17 is a member that transfers the heat generated in the core 11 and in the first inner cladding 12 to the outside environment.

Figure 2:
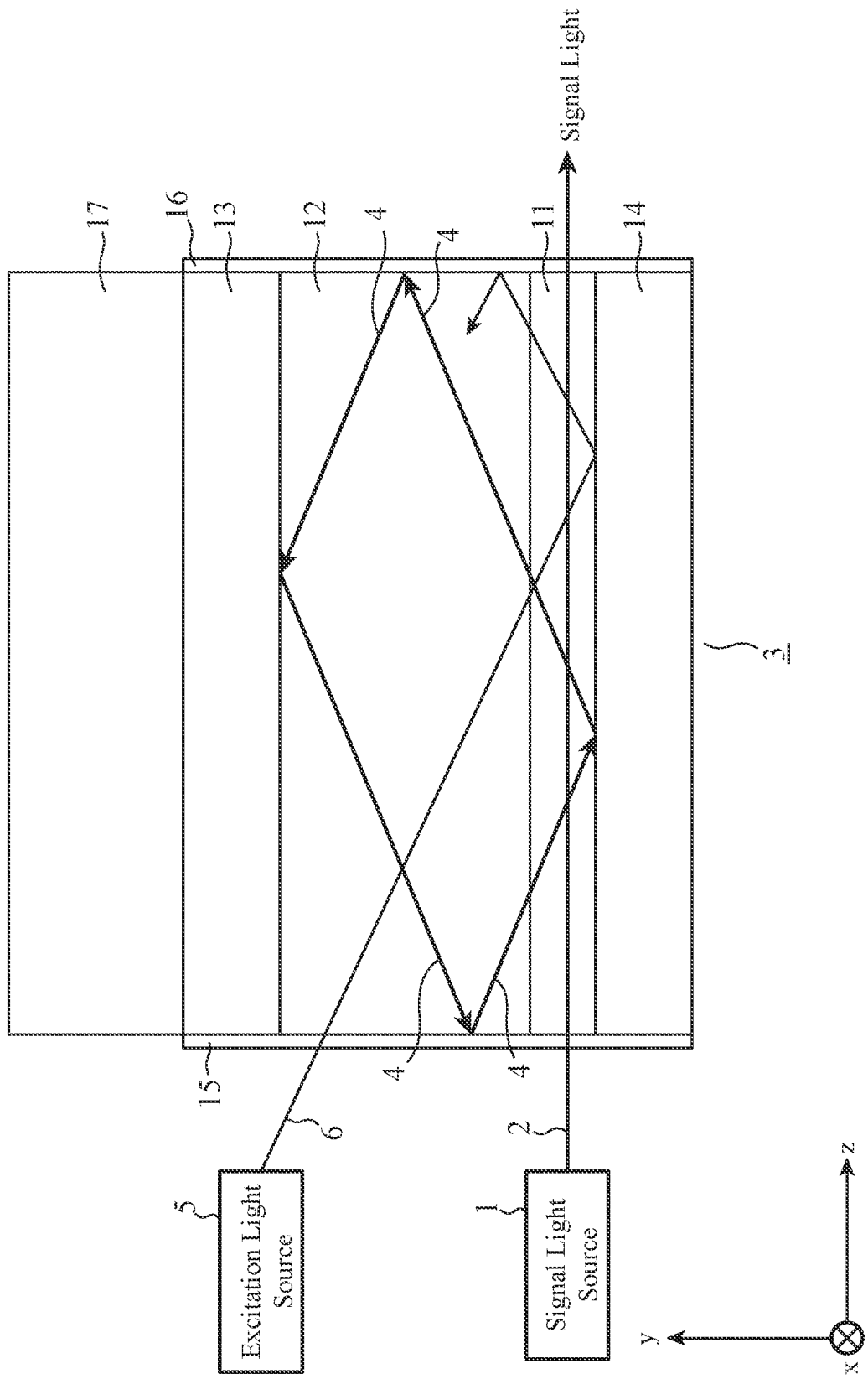
FIG. 2 is a configuration diagram illustrating a laser amplifier including another planar waveguide according to the first embodiment.

The example is illustrated in FIG. 1 in which the heat sink 17 is disposed on the bottom surface of the second outer cladding 14; however, a heat sink 17 may be disposed on the top surface of a first outer cladding 13 as illustrated in FIG. 2.

Figure 3:
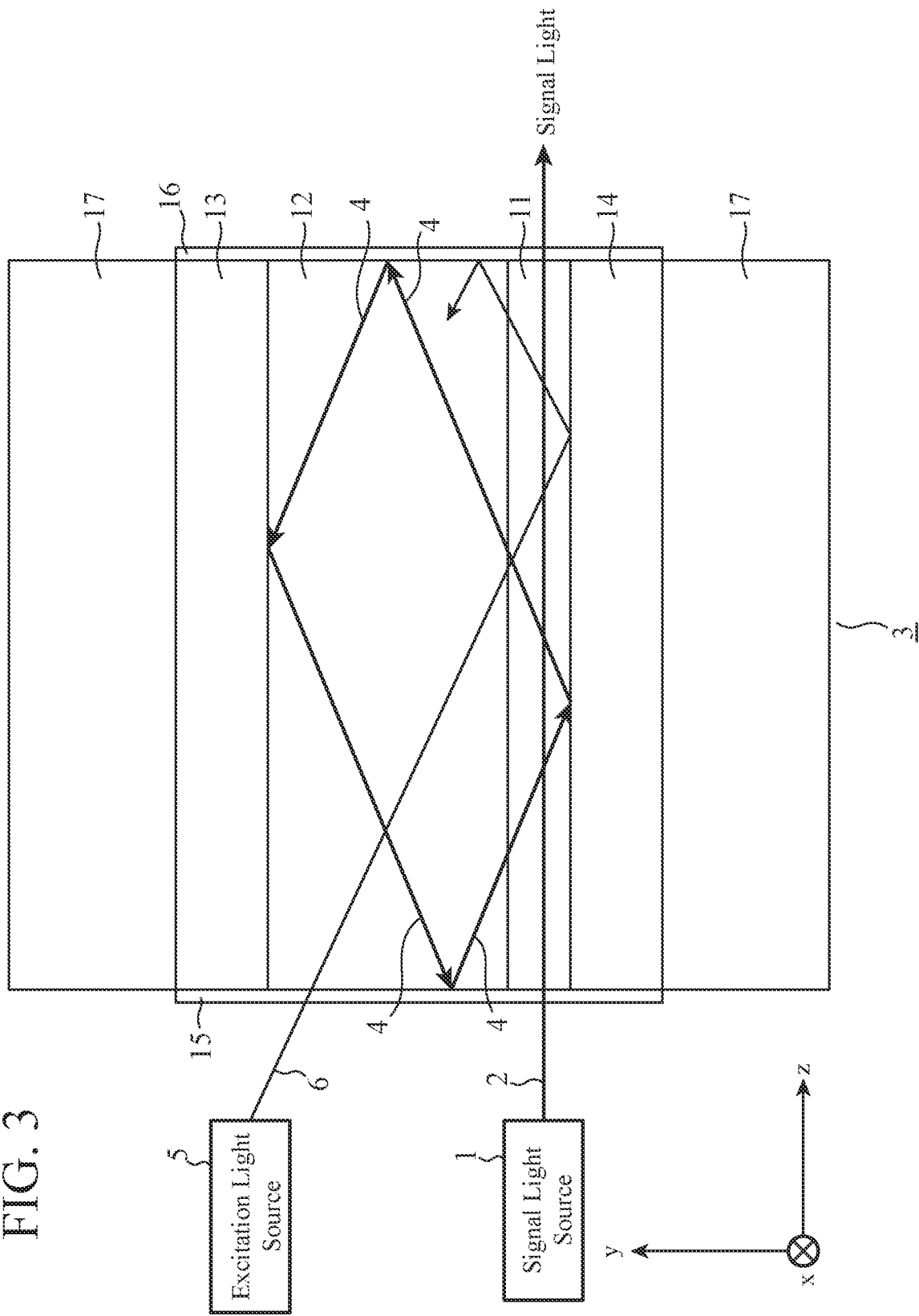
FIG. 3 is a configuration diagram illustrating a laser amplifier including still another planar waveguide according to the first embodiment.

Alternatively, as illustrated in FIG. 3, heat sinks 17 may be arranged on the bottom surface of a second outer cladding 14 and the top surface of a first outer cladding 13.

FIGS. 2 and 3 are configuration diagrams each illustrating a laser amplifier including another planar waveguide according to the first embodiment.

In the first embodiment, an example will be described in which Ho-doped glass is used as the core 11.

Ho-doped glass has a long upper-state lifetime and is suitable for amplifiers and Q-switched pulse lasers, but requires light of 1.9 µm or 1.1 µm for excitation thereof.

In a case where 1.1 µm light is used for excitation, the quantum defect is large, and thus more heat is likely to be generated, which may hinder high intensity.

In a case where 1.9 µm light is used for excitation, heat generation is less likely to increase, which enables high intensity. However, it is generally difficult to obtain a light source such as a laser diode that emits light having a high intensity of 1.9 µm.

Meanwhile, in a case where Tm-doped glass is used as the first inner cladding 12, Ho-doped glass can be used as the core 11 since the Tm-doped glass absorbs excitation light of 0.79 µm and generates a gain at 1.9 µm. A light source that emits high-intensity light of 0.79 µm is commonly available.

In the first embodiment, the excitation light source 5 is used as a light source that emits 0.79 µm light as the second excitation light.

In the first embodiment, an example will be described in which Ho-doped glass is used as the core 11 and Tm-doped glass is used as the first inner cladding 12. However, in the first embodiment, the first inner cladding 12 is only required to be capable of emitting the first excitation light 4 used for forming a population inversion in the core 11, and materials for the core 11 and the first inner cladding 12 are not limited to the above examples.

In the first embodiment, it is assumed that the refractive index of the core 11 is $n_0$, that the refractive index of the first inner cladding 12 is $n_{11}$, that the refractive index of the first outer cladding 13 is $n_{21}$, and that the refractive index of the second outer cladding 14 is $n_{22}$. These refractive indexes $n_0$, $n_{11}$, $n_{21}$, and $n_{22}$ are set so as to satisfy the following expressions (1) and (2) like in a general double cladding waveguide.

$$n_0 > n_{11} >> n_{21} \quad (1)$$

$$n_{11} >> n_{22} \quad (2)$$

In the first embodiment, the refractive index $n_0$ of the core 11 and the refractive index $n_{11}$ of the first inner cladding 12 are set to similar values, and the core 11 is used as a single mode or as a few mode waveguide.

For example in a case where $n_0=1.533$ and $n_{11}=1.530$ are set, if the thickness of the core 11 (dimension in the y direction) is 10 µm, light having a wavelength of 2.0 µm is propagated inside the core 11 in a single mode.

It is also assumed in the first embodiment that the refractive index $n_{11}$ of the first inner cladding 12, the refractive index $n_{21}$ of the first outer cladding 13, and the refractive index $n_{22}$ of the second outer cladding 14 are set at values greatly different from each other. With this setting, the areas of the core 11 and the first inner cladding 12 become a multimode waveguide, and the numerical aperture (hereinafter referred to as NA) of the waveguides increases.

For example, setting $n_{11}=1.530$ and $n_{21}=n_{22}=1.470$ gives NA of 0.42, which allows the planar waveguide 3 to guide light having a large beam divergence.

In a case where a laser amplifier capable of amplifying high-intensity signal light is fabricated, the planar waveguide 3 in the laser amplifier generates heat, thereby making the planar waveguide 3 hot, and thus the second outer cladding 14 in the planar waveguide 3 is provided with the heat sink 17.

Since the second outer cladding 14 in the planar waveguide 3 is a flat plate, the contact area with the heat sink 17 is large, thereby allowing the heat sink 17 to have a high heat removal capability.

By reducing the thickness of the second outer cladding 14 (dimension in the y direction), the heat removal effect of the heat sink 17 is enhanced, and the heat generated from the core 11 and the first inner cladding 12 that are heat sources can be easily removed.

Next, the operation of the laser amplifier including the planar waveguide 3 will be described.

The excitation light source 5 emits the second excitation light 6 to the planar waveguide 3.

The second excitation light 6 emitted from the excitation light source 5 enters the first inner cladding 12 and the core 11 in the planar waveguide 3.

Since the areas of the core 11 and the first inner cladding 12 can have a large NA, the second excitation light 6 can easily enter there even in a case where the excitation light source 5 is inexpensive with a high output but with poor beam quality, such as a laser diode.

When the second excitation light 6 is incident in the ±z direction, the second excitation light 6 is absorbed by the first inner cladding 12 while being propagated is the areas of the core 11 and the first inner cladding 12, and thus the absorption length can be increased.

In addition, when the second excitation light 6 is incident in the ±y direction, an approach to increase the absorption coefficient is necessary for sufficient absorption by the first inner cladding 12, such as thickening the first inner cladding 12 or increasing the concentration of Tm, which is a dopant of the first inner cladding 12.

When the second excitation light 6 emitted from the excitation light source 5 enters the first inner cladding 12, the first inner cladding 12 absorbs the second excitation light 6 to form a population inversion, and generates a gain for the first excitation light 4 by radiation transition.

The first inner cladding 12 emits the first excitation light 4 for which the gain has been generated. The first excitation light 4 emitted from the first inner cladding 12 enters the core 11.

Since the first inner cladding 12 emits the first excitation light 4, the laser amplifier does not need to be mounted with a light source or the like that emits the first excitation light 4.

The signal light source 1 emits the signal light 2 to the planar waveguide 3.

The first dielectric multilayer film 15 disposed on the end surface of the planar waveguide 3 transmits the signal light 2 emitted from the signal light source 1. The signal light 2 transmitted through the first dielectric multilayer film 15 enters the core 11 of the planar waveguide 3.

When the first excitation light 4 emitted from the first inner cladding 12 enters the core 11, the core 11 absorbs the first excitation light 4 to form a population inversion, and generates a gain for the signal light 2 by radiation transition.

The core 11 amplifies the signal light 2 when the signal light 2 enters there.

The second dielectric multilayer film 16 disposed on the end surface of the planar waveguide 3 transmits the signal light 2 amplified by the core 11. The signal light 2 transmitted through the second dielectric multilayer film 16 is emitted to the outside of the planar waveguide 3.

Here, as each of the first dielectric multilayer film 15 and the second dielectric multilayer film 16, a multilayer film having a high reflectance in a wavelength band including the wavelength of the first excitation light 4 is used. Therefore, the first excitation light 4 is reflected by the first dielectric multilayer film 15 and the second dielectric multilayer film 16, and thus travels back and forth between the first dielectric multilayer film 15 and the second dielectric multilayer film 16 while being propagated through the areas of the core 11 and the first inner cladding 12.

When the first excitation light 4 is propagated through the first inner cladding 12, a gain is given by the first inner cladding 12, thereby causing laser oscillation.

The first excitation light 4 causing laser oscillation is not emitted to the outside of the planar waveguide 3, but is absorbed by the core 11 when being propagated through the areas of the core 11 and the first inner cladding 12 between the first dielectric multilayer film 15 and the second dielectric multilayer film 16.

Since the core 11 generates a gain for the signal light 2 by absorbing the first excitation light 4, the signal light 2 is amplified when the signal light 2 emitted from the signal light source 1 is incident thereon.

Note that the first excitation light 4 has a higher intensity due to the laser oscillation and is efficient since it is directly absorbed by the core 11.

At this point, when laser oscillation occurs in a wavelength band close to the wavelength of the signal light 2, the gain for the signal light 2 that is energy stored in the core 11 is wasted, and thus it is necessary to prevent parasitic oscillation in a wavelength band close to the wavelength of the signal light 2 in order to enhance the amplification efficiency of the signal light 2.

In the first embodiment, a highly transmissive multilayer film is used as the first dielectric multilayer film 15 and the second dielectric multilayer film 16 in a wavelength band including the wavelength of the signal light 2 as a wavelength band close to the wavelength of the signal light 2. Therefore, light having the wavelength band close to the wavelength of the signal light 2 is transmitted through the first dielectric multilayer film 15 or the second dielectric multilayer film 16 and emitted to the outside of the planar waveguide 3. For this reason, parasitic oscillation in a wavelength band close to the wavelength of the signal light 2 can be prevented.

In the first embodiment described above, included are: the core 11; the first inner cladding 12; the first dielectric multilayer film 15 for transmitting light having a wavelength band including the wavelength of the signal light 2 and reflecting the first excitation light 4, the first dielectric multilayer film 15 disposed on one of two end surfaces of the first and second outer claddings 13 and 14; and the second dielectric multilayer film 16 for transmitting light having a wavelength band including the wavelength of the signal light 2 and reflecting the first excitation light 4, the second dielectric multilayer film 16 disposed on the other one of the two end surfaces. Therefore, there is an effect of preventing the parasitic oscillation of the core 11.

Second Embodiment

In the first embodiment, the laser amplifier including the planar waveguide 3 including the first inner cladding 12 has been described.

In a second embodiment, a laser amplifier including a planar waveguide 3 including a first inner cladding 12 and a second inner cladding 18 will be described.

Figure 4:
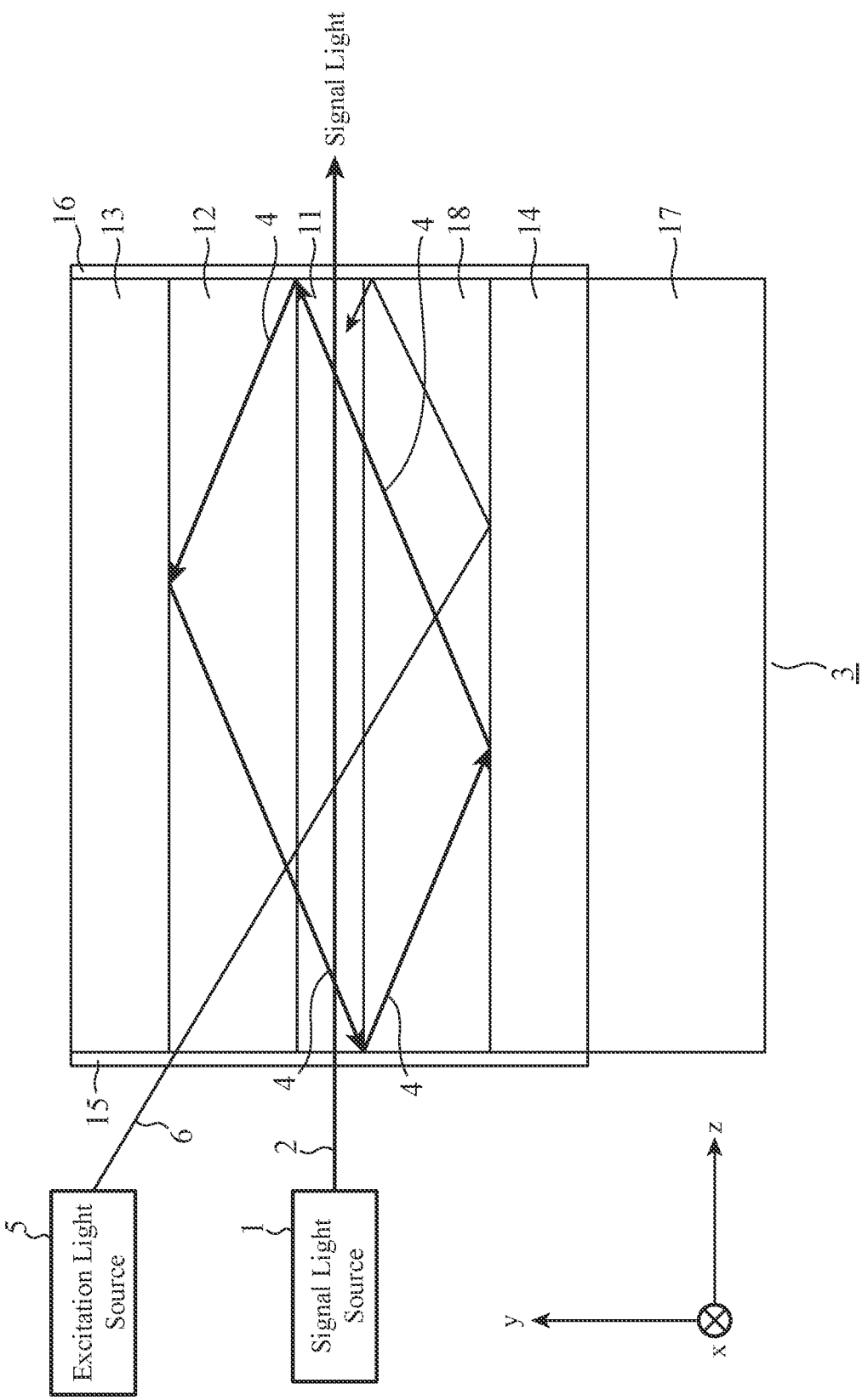
FIG. 4 is a configuration diagram illustrating a laser amplifier including a planar waveguide according to a second embodiment.

FIG. 4 is a configuration diagram illustrating a laser amplifier including a planar waveguide according to the second embodiment. In FIG. 4, the same symbol as that in FIG. 1 represents the same or a corresponding part, and thus description thereof is omitted.

The second inner cladding 18 is attached between a core 11 and a second outer cladding 14.

The second inner cladding 18 is a plate-like gain generating member that absorbs second excitation light 6 emitted from an excitation light source 5 to form a population inversion and generates a gain by radiation transition.

The second inner cladding 18 emits first excitation light 4 by absorbing the second excitation light 6 and forming the population inversion and reflects signal light 2.

As the second inner cladding 18, a material that can oscillate the excitation wavelength of the core 11 is used from among glass doped with rare earth elements such as Er, Yb, Tm, Nd, or Ho, a crystal doped with a rare earth such as Nd:YVO4, ceramic made from a crystal material doped with a rare earth element such as Yb:YAG, or a crystal doped with a transition metal such as Cr:YAG and Ti:Sapphire.

The second inner cladding 18 may be made of the same material as that of the first inner cladding 12. The second inner cladding 18 may be made of a material different from that of the first inner cladding 12 with the material doped with the same dopant as that of the first inner cladding 12. As the same dopant, a dopant such as Tm may be used.

For example, an additive may be added to glass for the purpose of defoaming; however, the additive in the second embodiment is a dopant related to light emission of a laser or the like. The second inner cladding 18 can absorb the second excitation light 6 and generate a gain for the first excitation light 4 by using a material doped with the same dopant as that of the first inner cladding 12.

In the second embodiment, it is assumed that the refractive index of the core 11 is $n_0$, that the refractive index of the first inner cladding 12 is $n_{11}$, that the refractive index of the second inner cladding 18 is $n_{12}$, that the refractive index of the first outer cladding 13 is $n_{21}$, and that the refractive index of the second outer cladding 14 is $n_{22}$. These refractive indexes $n_0$, $n_{11}$, $n_{21}$, and $n_{22}$ are set so as to satisfy the following expressions (3) and (4) like in a general double cladding waveguide.

$$n_0 > n_{11} >> n_{21} \qquad (3)$$

$$n_0 > n_{12} >> n_{22} \qquad (4)$$

Although an example is described in the second embodiment in which the second inner cladding 18 is applied to the planar waveguide 3 included in the laser amplifier illustrated in FIG. 1, the second inner cladding 18 may be applied to the planar waveguide 3 included in the laser amplifier illustrated in FIG. 2 or 3.

Next, the operation of the laser amplifier including the planar waveguide 3 will be described.

The excitation light source 5 emits the second excitation light 6 to the planar waveguide 3.

The second excitation light 6 emitted from the excitation light source 5 enters the first inner cladding 12, the core 11, and the second inner cladding 18 in the planar waveguide 3.

When the second excitation light 6 emitted from the excitation light source 5 enters the first inner cladding 12, the first inner cladding 12 absorbs the second excitation light 6 to form a population inversion, and generates a gain for the first excitation light 4 by radiation transition like in the first embodiment.

The first inner cladding 12 emits the first excitation light 4 for which the gain has generated. The first excitation light 4 emitted from the first inner cladding 12 enters the core 11.

When the second excitation light 6 emitted from the excitation light source 5 enters the second inner cladding 18, the second inner cladding 18 absorbs the second excitation light 6 to form a population inversion like the first inner cladding 12 does, and generates a gain for the first excitation light 4 by radiation transition.

The second inner cladding 18 emits the first excitation light 4 for which the gain has generated. The first excitation light 4 emitted from the second inner cladding 18 enters the core 11.

The signal light source 1 emits the signal light 2 to the planar waveguide 3.

The first dielectric multilayer film 15 disposed on the end surface of the planar waveguide 3 transmits the signal light 2 emitted from the signal light source 1. The signal light 2 transmitted through the first dielectric multilayer film 15 enters the core 11 of the planar waveguide 3.

When the first excitation light 4 emitted from each of the first inner cladding 12 and the second inner cladding 18 enters the core 11, the core 11 absorbs the first excitation light 4 to form a population inversion, and generates a gain for the signal light 2 by radiation transition.

The core 11 amplifies the signal light 2 when the signal light 2 enters there.

The second dielectric multilayer film 16 disposed on the end surface of the planar waveguide 3 transmits the signal light 2 amplified by the core 11. The signal light 2 transmitted through the second dielectric multilayer film 16 is emitted to the outside of the planar waveguide 3.

Here, as each of the first dielectric multilayer film 15 and the second dielectric multilayer film 16, a multilayer film having a high reflectance in a wavelength band including the wavelength of the first excitation light 4 is used like in the first embodiment. Therefore, the first excitation light 4 is reflected by the first dielectric multilayer film 15 and the second dielectric multilayer film 16, and thus travels back and forth between the first dielectric multilayer film 15 and the second dielectric multilayer film 16 while being propagated through the areas of the core 11, the first inner cladding 12, and the second inner cladding 18.

When the first excitation light 4 is propagated through each of the first inner cladding 12 and the second inner cladding 18, a gain is given by each of the first inner cladding 12 and the second inner cladding 18, thereby causing laser oscillation.

The first excitation light 4 causing the laser oscillation is not emitted to the outside of the planar waveguide 3, but is absorbed by the core 11 when being propagated through the areas of the core 11, the first inner cladding 12, and the second inner cladding 18 between the first dielectric multilayer film 15 and the second dielectric multilayer film 16.

Since the core 11 generates a gain for the signal light 2 by absorbing the first excitation light 4, the signal light 2 is amplified when the signal light 2 emitted from the signal light source 1 is incident thereon.

At this point, when laser oscillation occurs in a wavelength band close to the wavelength of the signal light 2, the gain for the signal light 2 that is energy stored in the core 11 is wasted, and thus it is necessary to prevent parasitic oscillation in a wavelength band close to the wavelength of the signal light 2 in order to enhance the amplification efficiency of the signal light 2.

In the second embodiment, a multilayer film having a high transmittance is used as the first dielectric multilayer film 15 and the second dielectric multilayer film 16 in a wavelength band including the wavelength of the signal light 2 as a wavelength band close to the wavelength of the signal light 2, and thus light having the wavelength band close to the wavelength of the signal light 2 is transmitted through the first dielectric multilayer film 15 or the second dielectric multilayer film 16 and emitted to the outside of the planar waveguide 3. For this reason, parasitic oscillation in a wavelength band close to the wavelength of the signal light 2 can be prevented.

An example is illustrated in the first embodiment in which the refractive indexes of the first inner cladding 12 and the second outer cladding 14 that are layers above and under the core 11 are asymmetric in order to confine the first excitation light 4 with a high NA.

In the second embodiment, since the second inner cladding 18 is attached between the core 11 and the second outer cladding 14, the refractive indexes of the first inner cladding 12 and the second inner cladding 18 that are layers above and under the core 11 can be made symmetrical or close to symmetrical.

By setting the refractive index of the first inner cladding 12 and the refractive index of the second inner cladding 18 at the same value, the profile of the beam that is the signal light 2 propagated through the planar waveguide 3 becomes symmetrical in the y direction, thereby improving the quality of the beam that is the signal light 2 emitted from the planar waveguide 3.

It is assumed in the second embodiment that the same dopant is doped to both materials in a case where the material of the first inner cladding 12 and the material of the second inner cladding 18 are different. In a case where the material of the first inner cladding 12 and the material of the second inner cladding 18 are different, each of the first inner cladding 12 and the second inner cladding 18 can add different functions to the core 11.

For example in a case where the material of the first inner cladding 12 is glass and the material of the second inner cladding 18 is a birefringent crystal, since adjustment of the refractive index of glass is relatively easy, setting the refractive index of the first inner cladding 12 to a value close to the refractive index of the core 11, the core 11 can be brought into a single mode.

Since birefringent crystal can have different propagation constants for each ray of polarized light, it becomes possible to impart a polarization maintaining function to the planar waveguide 3.

Third Embodiment

The example is illustrated in the second embodiment in which the second inner cladding 18, which emits the first excitation light by absorbing the second excitation light and forming a population inversion, is attached between the core 11 and the second outer cladding 14.

In a third embodiment, an example is illustrated in which a second inner cladding 19, which transmits first excitation light 4 and second excitation light 6 and reflects signal light 2, is attached between a core 11 and a second outer cladding 14.

Figure 5:
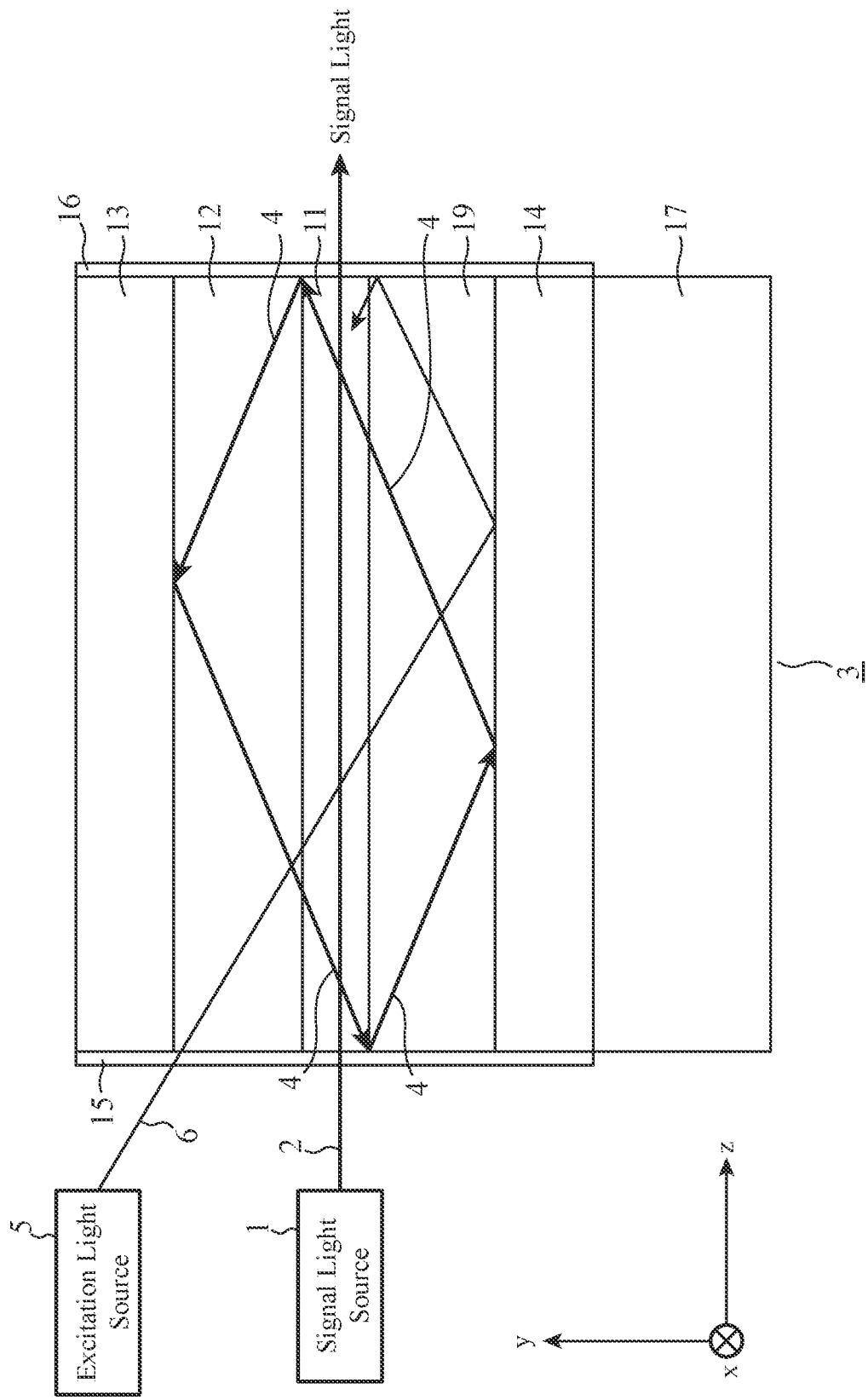
FIG. 5 is a configuration diagram illustrating a laser amplifier including a planar waveguide according to a third embodiment.

FIG. 5 is a configuration diagram illustrating a laser amplifier including a planar waveguide according to the third embodiment. In FIG. 5, the same symbol as that in FIG. 1 represents the same or a corresponding part, and thus description thereof is omitted.

The second inner cladding 19 is attached between the core 11 and the second outer cladding 14.

The second inner cladding 19 is a plate-like member that transmits each of the first excitation light 4 emitted from a first inner cladding 12 and the second excitation light 6 emitted from an excitation light source 5 and reflects signal light.

As the material of the second inner cladding 19, a material that is not doped with the same dopant as the dopant doped to the first inner cladding 12 and transmits each of the first excitation light 4 and the second excitation light 6 is used.

Although an example is described in the third embodiment in which the second inner cladding 19 is applied to the planar waveguide 3 included in the laser amplifier illustrated in FIG. 1, the second inner cladding 19 may be applied to the planar waveguide 3 included in the laser amplifier illustrated in FIG. 2 or 3.

Unlike the second inner cladding 18 in the second embodiment, the second inner cladding 19 does not have the function of absorbing the second excitation light 6 nor the function of emitting the first excitation light 4.

Since a planar waveguide 3 includes the second inner cladding 19, the rate of absorption of the second excitation light 6 in the planar waveguide 3 can be adjusted.

For example, in a case where the first inner cladding 12 is formed of a material doped with Tm as a dopant, the first excitation light 4 is absorbed under the condition that the second excitation light 6 is weak since Tm acts as a three level system.

If Tm absorbs the second excitation light 6 too much and thereby creates an area where the second excitation light 6 does not reach inside the planar waveguide 3, the first excitation light 4 is absorbed, thereby decreasing the efficiency.

Since in the third embodiment the planar waveguide 3 includes the second inner cladding 19 that does not absorb the second excitation light 6, it is possible to lower the rate of absorption of the second excitation light 6 per unit length to allow the second excitation light 6 to reach the inside of the planar waveguide 3. This rate of absorption of the second excitation light 6 per unit length can be adjusted by changing the ratio between the thickness of the first inner cladding 12 and the thickness of the second inner cladding 19.

Fourth Embodiment

The example is described in the first embodiment in which the parasitic oscillation of the core 11 is prevented by arranging each of the first dielectric multilayer film 15 and the second dielectric multilayer film 16 on the two end surfaces of the planar waveguide 3.

In a fourth embodiment, a laser amplifier that is more effective in preventing the parasitic oscillation of a core 11 than in the first embodiment will be described.

Figure 6:
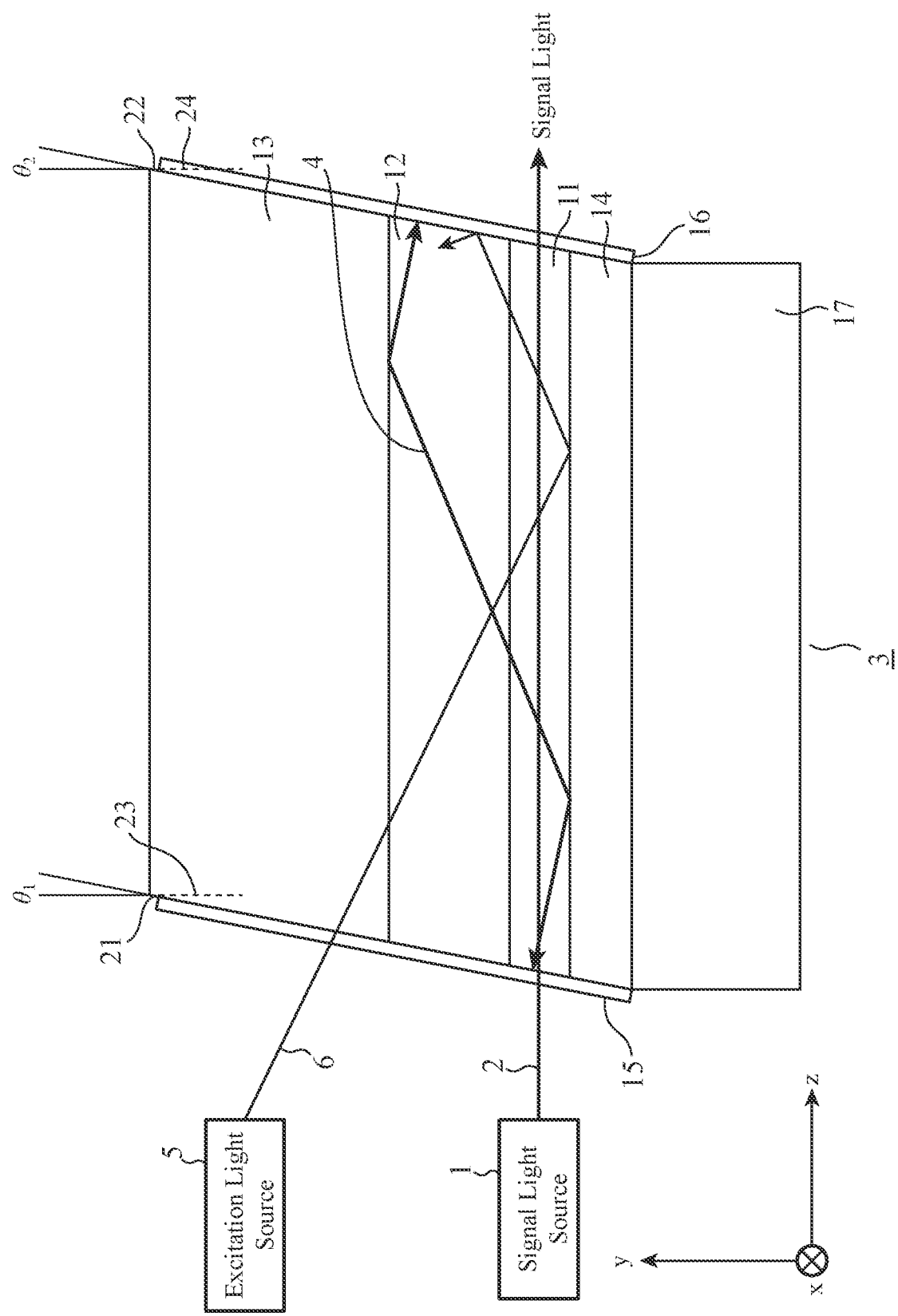
FIG. 6 is a configuration diagram illustrating a laser amplifier including a planar waveguide according to a fourth embodiment.

FIG. 6 is a configuration diagram illustrating a laser amplifier including a planar waveguide according to the fourth embodiment. In FIG. 6, the same symbol as that in FIG. 1 represents the same or a corresponding part and thus description thereof is omitted.

An end surface 21 is the left one in the figure among the two end surfaces of a planar waveguide 3.

An end surface 22 is the right one in the figure among the two end surfaces of the planar waveguide 3.

Vertical planes 23 and 24 are perpendicular to each plane of the core 11, a first inner cladding 12, a first outer cladding 13, and a second outer cladding 14, and are parallel to the y axis direction.

The end surfaces 21 and 22 are inclined with respect to the vertical planes 23 and 24 so that the signal light 2 leaks from the core 11 when the signal light 2 being propagated through the core 11 is reflected by the end surfaces 21 and 22, and that the first excitation light 4 remains between the first outer cladding 13 and the second outer cladding 14 when the first excitation light 4 being propagated between the first outer cladding 13 and the second outer cladding 14 is reflected by the end surfaces 21 and 22.

In the fourth embodiment, the angle between the end surface 21 and the vertical plane 23 is $\theta_1$, and the angle between the end surface 22 and the vertical plane 24 is $\theta_2$.

Since each of the first dielectric multilayer film 15 and the second dielectric multilayer film 16 transmits light in a wavelength band including the wavelength of the signal light 2, the parasitic oscillation of the core 11 is prevented.

However, in the first dielectric multilayer film 15 and the second dielectric multilayer film 16, the reflectance in a wavelength band near the wavelength of the signal light 2 is a finite value. For this reason, in a case where the gain of the signal light 2 in the core 11 is large, parasitic oscillation of the core 11 may occur.

Whether parasitic oscillation of the core 11 occurs is determined by a balance between the gain of the signal light 2 in the core 11 and the effect of preventing the parasitic oscillation by the first dielectric multilayer film 15 and the second dielectric multilayer film 16.

In the fourth embodiment, in order to enhance the effect of preventing parasitic oscillation and to obtain a laser amplifier having a larger gain than in the first embodiment, the two end surfaces 21 and 22 in the planar waveguide 3 are inclined with respect to the vertical planes 23 and 24.

By inclining the two end surfaces 21 and 22 in the planar waveguide 3 with respect to the vertical planes 23 and 24 so that the signal light 2 leaks from the core 11 when the signal light 2 being propagated through the core 11 is reflected by the end surfaces 21 and 22, it becomes possible to prevent the signal light 2 reflected by the end surfaces 21 and 22 from entering the core 11 again, that is, to prevent the signal light 2 reflected by the end surfaces 21 and 22 from being re-coupled with the core 11.

However, if the first excitation light 4 leaks out between the first outer cladding 13 and the second outer cladding 14 when the first excitation light 4 being propagated between the first outer cladding 13 and the second outer cladding 14 is reflected by the end surfaces 21 and 22, the gain for the signal light 2 in the core 11 is decreased.

In order to cause the first excitation light 4 to remain between the first outer cladding 13 and the second outer cladding 14, it is necessary to ensure that the angles $\theta_1$ and $\theta_2$ between the end surfaces 21 and 22 and the vertical planes 23 and 24, respectively, are not too large.

If the angles $\theta_1$ and $\theta_2$ between the end surfaces 21 and 22 and the vertical planes 23 and 24 satisfy the following condition (1), re-coupling of the signal light 2 with the core 11 can be prevented.

$$\arccos(n_{11}/n_0) < \theta_1$$

$$\arccos(n_{11}/n_0) < \theta_2 \quad \text{[Condition 1]}$$

In condition (1), $n_0$ denotes the refractive index of the core 11, and $n_{11}$ denotes the refractive index of the first inner cladding 12.

Moreover, if the angles $\theta_1$ and $\theta_2$ between the end surfaces 21 and 22 and the vertical planes 23 and 24 satisfy the following condition (2), leakage of the first excitation light 4 from between the first outer cladding 13 and the second outer cladding 14 can be prevented.

$$\theta_1 < \arccos(n_{21}/n_{11})$$

$$\theta_1 < \arccos(n_{22}/n_0)$$

$$\theta_2 < \arccos(n_{21}/n_{11})$$

$$\theta_2 < \arccos(n_{22}/n_0) \quad \text{[Condition 2]}$$

In condition (2), $n_{21}$ denotes the refractive index of the first outer cladding 13, and $n_{22}$ denotes the refractive index of the second outer cladding 14.

For example in a case where the refractive index of the core 11 is $n_0=1.533$, the refractive index of the first inner cladding 12 is $n_{11}=1.530$, the refractive index of the first outer cladding 13 is $n_{21}=1.470$, and the refractive index of the second outer cladding 14 is $n_{22}=1.470$, setting the angles $\theta_1$ and $\theta_2$ to an angle within 3.585073 and 16.09893 can prevent recoupling of the signal light 2 and leakage of the first excitation light 4.

In the fourth embodiment, the end surfaces 21 and 22 are inclined with respect to the vertical planes 23 and 24 so that the signal light 2 leaks from the core 11 when the signal light 2 being propagated through the core 11 is reflected by the end surfaces 21 and 22, and that the first excitation light 4 remains between the first outer cladding 13 and the second outer cladding 14 when the first excitation light 4 being propagated between the first outer cladding 13 and the second outer cladding 14 is reflected by the end surfaces 21 and 22. Therefore, it is possible to enhance the effect of preventing parasitic oscillation and to obtain a laser amplifier having a larger gain than in the first embodiment.

Although the example in which the two end surfaces 21 and 22 in the planar waveguide 3 included in the laser amplifier illustrated in FIG. 1 are inclined with respect to the vertical planes 23 and 24 is illustrated in the fourth embodiment, the two end surfaces 21 and 22 of the planar waveguide 3 included in the laser amplifier illustrated in FIG. 4 in the second embodiment may be inclined with respect to the vertical planes 23 and 24.

Since the planar waveguide 3 included in the laser amplifier illustrated in FIG. 4 includes the second inner cladding 18, when the angles $\theta_1$ and $\theta_2$ between the end surfaces 21 and 22 and the vertical planes 23 and 24 satisfy the following condition (3), re-coupling of the signal light 2 with the core 11 can be prevented.

$$\arccos(n_{11}/n_0) < \theta_1$$

$$\arccos(n_{12}/n_0) < \theta_1$$

$$\arccos(n_{11}/n_0) < \theta_2$$

$$\arccos(n_{12}/n_0) < \theta_2 \quad \text{[Condition 3]}$$

In condition (3), $n_{12}$ denotes the refractive index of the second inner cladding 18.

Furthermore, when the angles $\theta_1$ and $\theta_2$ between the end surfaces 21 and 22 and the vertical planes 23 and 24, respectively, satisfy the following condition (4), leakage of the first excitation light 4 from between the first outer cladding 13 and the second outer cladding 14 can be prevented.

$$\theta_1 < \arccos(n_{21}/n_{11})$$

$$\theta_1 < \arccos(n_{22}/n_{12})$$

$$\theta_2 < \arccos(n_{21}/n_{11})$$

$$\theta_2 < \arccos(n_{22}/n_{12}) \quad \text{[Condition 4]}$$

Although the example in which the two end surfaces 21 and 22 in the planar waveguide 3 included in the laser amplifier illustrated in FIG. 1 are inclined with respect to the vertical planes 23 and 24 is illustrated in the fourth embodiment, the two end surfaces 21 and 22 of the planar waveguide 3 included in the laser amplifier illustrated in FIG. 5 in the third embodiment may be inclined with respect to the vertical planes 23 and 24.

Since the planar waveguide 3 included in the laser amplifier illustrated in FIG. 5 includes the second inner cladding 19, when the angles $\theta_1$ and $\theta_2$ between the end surfaces 21 and 22 and the vertical planes 23 and 24 satisfy the following condition (5), re-coupling of the signal light 2 with the core 11 can be prevented.

$$\arccos(n_{11}/n_0) < \theta_1$$

$$\arccos(n_{13}/n_0) < \theta_1$$

$\arccos(n_{11}/n_0)<\theta_2$ $\arccos(n_{13}/n_0)<\theta_2$ [Condition 5]

In condition (5), $n_0$ denotes the refractive index of the second inner cladding 19.

Moreover, when the angles $\theta_1$ and $\theta_2$ between the end surfaces 21 and 22 and the vertical planes 23 and 24 satisfy the following condition (6), leakage of the first excitation light 4 from between the first outer cladding 13 and the second outer cladding 14 can be prevented.

$\theta_1<\arccos(n_{21}/n_{11})$ $\theta_1<\arccos(n_{22}/n_{13})$ $\theta_2<\arccos(n_{21}/n_{11})$ $\theta_2<\arccos(n_{22}/n_{13})$ [Condition 6]

Note that the present invention may include a flexible combination of each embodiment, a modification of any component of the embodiments, or an omission of any component in the embodiments within the scope of the present invention.

INDUSTRIAL APPLICABILITY

The present invention is suitable for a planar waveguide including a plate-like core for amplifying signal light by absorbing first excitation light and forming a population inversion.

The present invention is suitable for a laser amplifier having a planar waveguide.

REFERENCE SIGNS LIST

1: Signal light source, 2: Signal light, 3: Planar waveguide, 4: First excitation light, 5: Excitation light source, 6: Second excitation light, 11: Core, 12: First inner cladding, 13: First outer cladding, 14: Second outer cladding, 15: First dielectric multilayer film, 16: Second dielectric multilayer film, 17: Heat sink, 18: Second inner cladding, 19: Second inner cladding, 21, 22: End surface, 23, 24: Vertical plane.

The invention claimed is:
1. A planar waveguide comprising:
a plate-like core to amplify signal light by absorbing first excitation light and forming a population inversion;
a plate-like first inner cladding to emit the first excitation light by absorbing second excitation light and forming a population inversion and reflecting the signal light, the first inner cladding being attached to one of two planes of the core;
a plate-like first outer cladding to reflect the first excitation light, the first outer cladding being attached to, of two planes of the first inner cladding, a plane opposite to a plane to which the core is attached;
a plate-like second outer cladding to reflect each of the first excitation light and the signal light, the second outer cladding being attached to, of the two planes of the core, a plane opposite to the plane to which the first inner cladding is attached;
a first dielectric multilayer film to transmit light in a wavelength band including a wavelength of the signal light and reflect the first excitation light, the first dielectric multilayer film being disposed on one of two end surfaces of the core, the first inner cladding, and the first and second outer claddings, and;
a second dielectric multilayer film to transmit light in a wavelength band including the wavelength of the signal light and reflect the first excitation light, the second dielectric multilayer film being disposed on another one of the two end surfaces.

2. The planar waveguide according to claim 1, wherein a heat sink, which removes heat generated in the core or the first inner cladding, is disposed on, of two planes of the second outer cladding, a plane opposite to the plane to which the core is attached.

3. The planar waveguide according to claim 1, wherein a heat sink, which removes heat generated in the core or the first inner cladding, is disposed on, of two planes of the first outer cladding, a plane opposite to the plane to which the first inner cladding is attached.

4. The planar waveguide according to claim 1, further comprising a plate-like second inner cladding to emit the first excitation light by absorbing the second excitation light and forming a population inversion and reflect the signal light, the second inner cladding being attached between the core and the second outer cladding.

5. The planar waveguide according to claim 1, further comprising a plate-like second inner cladding to transmit the first and second excitation light and reflecting the signal light, the second inner cladding being attached between the core and the second outer cladding.

6. The planar waveguide according to claim 1, wherein the two end surfaces are inclined with respect to planes that are perpendicular to each of the planes of the core, the first inner cladding, the first outer cladding, and the second outer cladding so that the signal light leaks from the core when the signal light being propagated through the core is reflected by the end surfaces and that the first excitation light remains between the first outer cladding and the second outer cladding when the first excitation light being propagated between the first outer cladding and the second outer cladding is reflected by the end surfaces.

7. The planar waveguide according to claim 6, wherein an angle $\theta_1$ between the one of the two end surfaces and the plane perpendicular thereto and an angle $\theta_2$ between the another one of the two end surfaces and the plane perpendicular thereto satisfy conditions below where a refractive index of the core is denoted by $n_0$, a refractive index of the first inner cladding is denoted by $n_{11}$, a refractive index of the first outer cladding is denoted by $n_{21}$, and a refractive index of the second outer cladding is denoted by $n_{22}$:

$\arccos(n_{11}/n_0)<\theta_1$ $\arccos(n_{11}/n_0)<\theta_2$ $\theta_1<\arccos(n_{21}/n_{11})$ $\theta_1<\arccos(n_{22}/n_0)$ $\theta_2<\arccos(n_{21}/n_{11})$ $\theta_2<\arccos(n_{22}/n_0)$. [Conditions]

8. The planar waveguide according to claim 4, wherein the two end surfaces are inclined with respect to planes that are perpendicular to each of the planes of the core, the first inner cladding, the second inner cladding, the first outer cladding, and the second outer cladding so that the signal light leaks from the core when the signal light being propagated through the core is reflected by the end surfaces and that the first excitation light remains between the first outer cladding and the second outer cladding when the first excitation light being propagated between the first outer cladding and the second outer cladding is reflected by the end surfaces.

9. The planar waveguide according to claim 8, wherein an angle $\theta_1$ between the one of the two end surfaces and the plane perpendicular thereto and an angle $\theta_2$ between the other one of the two end surfaces and the plane perpendicular thereto satisfy conditions below where a refractive index of the core is denoted by $n_0$, a refractive index of the first inner cladding is denoted by $n_{11}$, a refractive index of the second inner cladding is denoted by $n_{12}$, a refractive index of the first outer cladding is denoted by $n_{21}$, and a refractive index of the second outer cladding is denoted by $n_{22}$:

$\arccos(n_{11}/n_0) < \theta_1$ $\arccos(n_{12}/n_0) < \theta_1$ $\arccos(n_{11}/n_0) < \theta_2$ $\arccos(n_{12}/n_0) < \theta_2$ $\theta_1 < \arccos(n_{21}/n_{11})$ $\theta_1 < \arccos(n_{22}/n_{12})$ $\theta_2 < \arccos(n_{21}/n_{11})$ $\theta_2 < \arccos(n_{22}/n_{12})$. [Conditions]

10. The planar waveguide according to claim 5, wherein the two end surfaces are inclined with respect to planes that are perpendicular to each of the planes of the core, the first inner cladding, the second inner cladding, the first outer cladding, and the second outer cladding so that the signal light leaks from the core when the signal light being propagated through the core is reflected by the end surfaces and that the first excitation light remains between the first outer cladding and the second outer cladding when the first excitation light being propagated between the first outer cladding and the second outer cladding is reflected by the end surfaces.

11. The planar waveguide according to claim 10, wherein an angle $\theta_1$ between the one of the two end surfaces and the plane perpendicular thereto and an angle $\theta_2$ between the other one of the two end surfaces and the plane perpendicular thereto satisfy conditions below where a refractive index of the core is denoted by $n_0$, a refractive index of the first inner cladding is denoted by $n_{11}$, a refractive index of the second inner cladding is denoted by $n_{13}$, a refractive index of the first outer cladding is denoted by $n_{21}$, and a refractive index of the second outer cladding is denoted by $n_{22}$:

$\arccos(n_{11}/n_0) < \theta_1$ $\arccos(n_{13}/n_0) < \theta_1$ $\arccos(n_{11}/n_0) < \theta_2$ $\arccos(n_{13}/n_0) < \theta_2$ $\theta_1 < \arccos(n_{21}/n_{11})$ $\theta_1 < \arccos(n_{22}/n_{13})$ $\theta_2 < \arccos(n_{21}/n_{11})$ $\theta_2 < \arccos(n_{22}/n_{13})$. [Conditions]

12. A laser amplifier comprising:
a signal light source to emit signal light;
a plate-like core to amplify the signal light emitted from the signal light source by absorbing first excitation light and forming a population inversion;
a plate-like first inner cladding to emit the first excitation light by absorbing second excitation light and forming a population inversion and reflect the signal light, the first inner cladding being attached to one of two planes of the core;
a plate-like first outer cladding to reflect the first excitation light, the first outer cladding being attached to, of two planes of the first inner cladding, a plane opposite to a plane to which the core is attached;
a plate-like second outer cladding to reflect each of the first excitation light and the signal light, the second outer cladding being attached to, of the two planes of the core, a plane opposite to the plane to which the first inner cladding is attached;
a first dielectric multilayer film to transmit light in a wavelength band including a wavelength of the signal light and reflect the first excitation light, the first dielectric multilayer film being disposed on one of two end surfaces of the core, the first inner cladding, and the first and second outer claddings, and;
a second dielectric multilayer film to transmit light in a wavelength band including the wavelength of the signal light and reflect the first excitation light, the second dielectric multilayer film being disposed on another one of the two end surfaces.

* * * * *